United States Patent [19]

Yamana et al.

[11] Patent Number: 5,525,150
[45] Date of Patent: Jun. 11, 1996

[54] MOLD RELEASE AGENT

[75] Inventors: Masayuki Yamana; Ikuo Yamamoto; Shingo Fujiwara, all of Settsu, Japan

[73] Assignee: Daikin Industries Ltd., Osaka, Japan

[21] Appl. No.: 170,210

[22] PCT Filed: Apr. 27, 1993

[86] PCT No.: PCT/JP93/00544

§ 371 Date: Feb. 22, 1994

§ 102(e) Date: Feb. 22, 1994

[87] PCT Pub. No.: WO93/22121

PCT Pub. Date: Nov. 11, 1993

[30] Foreign Application Priority Data

Apr. 28, 1992 [JP] Japan .................... 4-109566

[51] Int. Cl.$^6$ .................... C09K 3/00; B28B 7/36
[52] U.S. Cl. .................... 106/38.22; 106/287.27; 106/287.24
[58] Field of Search ............... 106/38.22, 287.23, 106/287.24

[56] References Cited

U.S. PATENT DOCUMENTS 4,427,803  1/1984  Fukui et al. .................... 523/402

FOREIGN PATENT DOCUMENTS

| 0310966 | 9/1988 | European Pat. Off. |
| 0315078 | 5/1989 | European Pat. Off. |
| 58-180598 | 10/1983 | Japan. |
| 59-32513 | 8/1984 | Japan. |
| 59-166596 | 9/1984 | Japan. |
| 61-112610 | 5/1986 | Japan. |
| 1-285312 | 11/1989 | Japan. |
| 1-291908 | 11/1989 | Japan. |

*Primary Examiner*—David Brunsman
*Attorney, Agent, or Firm*—Birch, Stewart, Kolasch & Birch

[57] ABSTRACT

A water-based mold release agent, which contains a halogen-containing polyether having at least one functional group as a main component, gives no environmental pollution, has excellent dispersibility, storage stability and mold releasability and gives a good surface state to a shaped article of a polymeric material.

11 Claims, No Drawings

MOLD RELEASE AGENT

This is a 371 of PCT/JP93/00544.

FIELD OF THE INVENTION

The present invention relates to a mold release agent. Particularly, it relates to a water-based mold release agent used for the preparation of a shaped article of a polymeric material such as a synthetic resin and a rubber.

RELATED ART AND PROBLEMS

Hitherto, an organic solvent-based mold release agent comprising a halogen-containing polyether as a main component is known (cf. Japanese Patent Kokai Publication No. 112610/1986). Although the mold release agent comprising the halogen-containing polyether has good mold releasability, it has the problem that the environment is polluted during the use of it since it contains the organic solvent. It is required to develop a water-based mold release agent comprising a halogen-containing polyether as the main component, which is free from the environmental pollution. The water-based mold release agent comprising the halogen-containing polyether as the main component which is disclosed in Japanese Patent Kokai Publication No. 112610/1986 has the problem that the mold release agent has poor storage stability (namely, the halogen-containing polyether is separated from the mold release agent).

SUMMARY OF THE INVENTION

An object of the present invention is to provide a water-based mold release agent which is free from the environmental pollution problem during its use, which has excellent dispersibility, storage stability and mold releasability and which gives a good surface state to a molded article of a polymeric material.

The present invention provides a water-based mold release agent comprising, as a main component, a halogen-containing polyether having at least one functional group.

DETAILED DESCRIPTION OF THE INVENTION

The mold release agent according to the present invention comprises
a) the halogen-containing polyether having at lease one functional group,
b) a surfactant, and
c) water.

The halogen-containing polyether used in the present invention has at least one functional group, and the halogen-containing polyether having no functional group which is described in Japanese Patent Kokai Publication No. 112610/1986 is not preferable in the present invention.

The halogen-containing polyether having at least one functional group may be well-known one and is described in Japanese Patent Kokai Publication No. 131132/1989 (corresponding to U.S. Pat. No. 4,836,944, the disclosure of which is incorporated herein by reference), Japanese Patent Kokai Publication No. 134189/1991, Japanese Patent Kokai Publication No. 268664/1989 (corresponding to U.S. Pat. No. 5,004,544, the disclosure of which is incorporated herein by reference), and Japanese Patent Kokai Publication No. 132917/1991.

A perfluoropolyether having at lease one functional group is preferable. Specific examples of the preferable halogen-containing polyether are

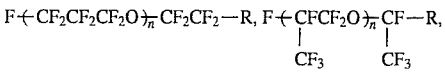

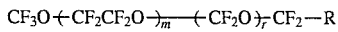

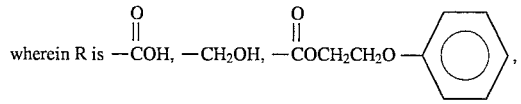

wherein R is $-COH$, $-CH_2OH$, $-COCH_2CH_2O-\bigcirc$,

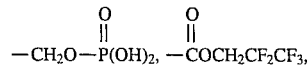

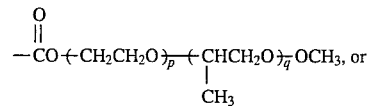

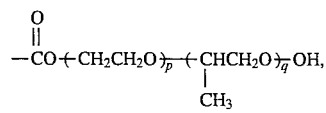

m is 1 to 50, n is 1 to 100, p is 0 to 100, q is 0 to 100 and r is 1 to 50.

A perfluoropolyether having a carboxylic acid group or salt thereof is preferable in view of the adherence to a mold surface.

The halogen-containing polyether preferably has an average molecular weight of 1,000 to 5,000, more preferably 1,500 to 3,500.

The surfactant used in the present invention may be any of a hydrocarbon surfactant and a fluorine-containing surfactant. Specific examples of the surfactant are Rapizol B-80 (manufactured by Nippon Oil and Fats Co., Ltd.), Nonion NS 230 (manufactured by Nippon Oil and Fats Co., Ltd.), Nonion NS 220 (manufactured by Nippon Oil and Fats Co., Ltd.), Unidine DS 403 (Daikin Industries Ltd.). Among them, the nonionic surfactant is preferable in view of the storage stability. When a nonionic hydrocarbon surfactant is used, the mold release agent is transparent (no cloudiness) and has remarkably excellent storage stability.

The water-based mold release agent according to the present invention can be prepared, for example, by emulsifying the halogen-containing polyether, the surfactant and water by an ultrasonic homogenizer.

The water-based mold release agent according to the present invention may further contains d) a phosphate ester or a salt thereof having a pefluoroalkyl group having 4 to 20 carbon atoms. Specific examples of the perfluoroalkyl group-containing phosphate ester are

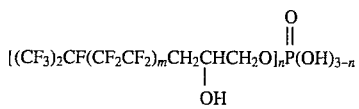

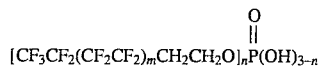

wherein m is 1 to 9, n is 1, 2 or 3.

In view of the stability, it is preferable that the halogen-containing polyether is emulsified in water and then the perfluoroalkyl group-containing phosphate ester is added to the emulsion.

The phosphate ester having the perfluoroalkyl group having 4 to 20 carbon atoms gives, for example, excellent releasability for a urethane.

The water-based mold release agent according to the present invention may contain a silicone or wax compound. The silicone or wax compound improves the surface state of the shaped article so as to reduce a cell collapse, particularly in the case of the polyurethane foam which tends to have the cell collapse.

Specific examples of the silicone compound are a silicone oil, a silicone resin, a mixture of silicone oil and resin. Specific example of the wax compound is a paraffinic wax.

The water-based mold release agent according to the present invention comprises a) 1 part by weight of the halogen-containing polyether,
b) 0.02 to 0.8 parts by weight, preferably 0.1 to 0.5 parts by weight of the surfactant, and
d) 0 to 1.0 parts by weight, preferably 0.1 to 0.8 parts by weight, more preferably 0.2 to 0.3 parts by weight of the perfluoroalkyl group-containing phosphate ester or salt thereof.

The amount of silicone or wax compound is from 0 to 5.0 parts by weight, preferably from 0 to 1.0 parts by weight per 1 part by weight of the halogen-containing polyether.

The water-based mold release agent according to the present invention may contain usually 0.1 to 20% by weight, preferably 0.5 to 10% by weight of the components other than water c). The mold release agent can be used in a low concentration, migrates to the shaped article in a very low amount, and gives an easy post-treatment (good coating property and adhesion property).

The mold release agent according to the present invention can be used as an internal mold release agent, but it is preferably used as an external mold release agent. When the mold release agent according to the present invention is coated on a mold, any of a brush coating method, a dip coating method, a spray coating method and the like can be used.

The mold release agent according to the present invention is useful for the preparation of the shaped article made of a synthetic resin and a rubber, particularly a polyurethane or a polyurea.

PREFERRED EMBODIMENT OF THE INVENTION

The present invention will be illustrated by the following Examples and Comparative Examples.

EXAMPLES 1 TO 11 AND COMPARATIVE EXAMPLES 1 TO 4

A mold release agent was prepared by emulsifying the components shown in Table 1 at 25° C. for 6 minutes by the use of an ultrasonic homogenizer (manufactured by Choonpakogyo Co. Ltd., Output: 300 W).

Then, the mold release agent was coated on a mold, and a urethane foam was molded from a liquid A and a liquid B shown in Table 2.

The mold releasability and the surface state of the shaped article were evaluated. A mold release stress (g/cm$^2$) was measured by the use of an autographic device (manufactured by Shimadzu Corp., DCM-50M). The results are shown in Table 3. Table 3 also show stability of the mold release agent.

TABLE 1

| Example No. | Halogen-containing polyether | Hydrocarbon surfactant | Phosphate ester having perfluoroalkyl group | Medium |
|---|---|---|---|---|
| 1 | Demnum SH 5% | NS 230 0.10% | — | Water |
| 2 | Demnum SH 5% | NS 230 0.25% | — | Water |
| 3 | Demnum SH 5% | NS 230 0.50% | — | Water |
| 4 | Demnum SH 5% | NS 230 1.00% | — | Water |
| 5 | Demnum SH 5% | NS 230 1.50% | — | Water |
| 6 | Demnum SH 5% | NS 230 2.50% | — | Water |
| 7 | Demnum SP 5% | NS 230 1.00% | — | Water |
| 8 | Demnum P 5% | NS 230 1.00% | — | Water |
| 9 | Demnum SH 5% | NS 230 1.00% | 1.5% | Water |
| 10 | Demnum SH 5% | DS-403 0.25% | — | Water |
| 11 | Demnum SH 5% | DS-403 0.25% | 1.5% | Water |
| Com. 1 | Demnum S-20 5% | NS 230 1.00% | — | Water |
| Com. 2 | Demnum S-20 5% | — | — | Trifluoro chloroethane |
| Com. 3 | Silicone emulsion SH 7036 (manufactured by Toray-Dow Corning Ltd.) 5% | — | — | Water |
| Com. 4 | Wax emulsion EM 0001 (manufactured by Nippon Seiroh Ltd.) 5% | — | — | Water |

Note)
Demnum SH: manufactured by Daikin Industries Ltd.

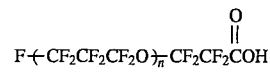

(n is from 20 to 22)
Demnum SP: manufactured by Daikin Industries Ltd.

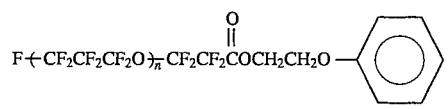

(n is from 20 to 22)
Demnum P: manufactured by Daikin Industries Ltd.

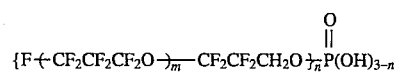

(m is from 20 to 22, and n is 1, 2 or 3)
Demnum S-20: manufactured by Daikin Industries Ltd.

(n is 16)
DS-403: Unidine DS-403 manufactured by Daikin Industries Ltd.

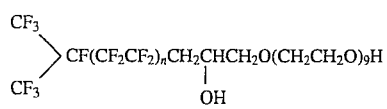

(n is 1 to 9)
NS-230: manufactured by Nippon Oil and Fats Co. Ltd.

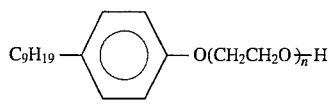

(n is 30)

TABLE 2

| Liquid A | Sannix FA-912 | Polyol | 100 pbw | manufactured by Sanyo Chemical Industries Ltd. |
|---|---|---|---|---|
| | Ethylene glycol | Cross-linking agent | 9 pbw | manufactured by Sanyo Chemical Industries Ltd. |
| | Flon 11 U | Foaming agent | 15 pbw | manufactured by Sanyo Chemical Industries Ltd. |
| | DABCO 33 LV | Catalyst | 4 pbw | manufactured by Sanyo Chemical Industries Ltd. |
| Liquid B | Colonate 1040 | Iso-cyanate | 65 pbw | manufactured by Nippon Polyurethane Ltd. |

Molding conditions:

| Mold material | aluminum |
|---|---|
| Mold size | 5.5 cm diameter × 1.0 cm |
| Stirring time | 5,000 rpm × 10 seconds |
| Foaming and curing time | 10 minutes |
| Mold temperature | 400° C. |
| Method of coating the mold release agent | brush-coating at room temperature |

TABLE 3

| Example No. | Stability | Mold releasability (g/cm$^2$) | Surface state |
|---|---|---|---|
| 1 | Good | 160 | Good |
| 2 | Good | 170 | Good |
| 3 | Good | 95 | Good |
| 4 | Very good | 110 | Good |
| 5 | Very good | 125 | Good |
| 6 | Very good | 150 | Good |
| 7 | Good | 150 | Good |
| 8 | Good | 230 | Good |
| 9 | Good | 100 | Good |
| 10 | Good | 150 | Good |
| 11 | Good | 160 | Good |
| Com. 1 | Bad | 190 | Good |
| Com. 2 | Very good | 230 | Pinholes formed |
| Com. 3 | Very good | 300 | Good |
| Com. 4 | Very good | 350 | Good |

Note)
Stability:
Very Good: Transparent (not separated after two weeks)
Good: Milky white (separated after one week)
Bad: Milky white (separated after two days)
Surface state:
Good: No cell collapse

EFFECTS OF THE INVENTION

The water-based mold release agent according to the present invention gives no environmental pollution, has excellent dispersibility, storage stability and mold releasability and gives a good surface state to the shaped article of the polymeric material.

In addition, the water-based mold release agent according to the present invention forms a reversed micelle having the functional group present in water. The water-based mold release agent according to the present invention is adsorbed easily and selectively by the mold surface and can form a tough coating film having good durability. The water-based mold release agent according to the present invention can give more uniform thickness of a coating film than an organic solvent-based mold release agent.

What is claimed is:

1. A water-based mold release agent which comprises:
   (a) a halogen-containing polyether having at least one functional group;
   (b) a surfactant;
   (c) water; and
   (d) a phosphate ester or salt thereof having a perfluoroalkyl group having 4 to 20 carbon atoms.

2. The water-based mold release agent according to claim 1, wherein the functional group is a carboxylic acid group or salt thereof.

3. The water-based mold release agent according to claim 1, wherein the halogen-containing polyether is a perfluoropolyether and the surfactant is a nonionic surfactant.

4. The water-based mold release agent according to claim 3, wherein said perfluoropolyether is a compound of formula (I), (II) or (III) below:

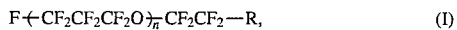

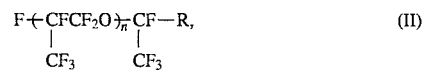

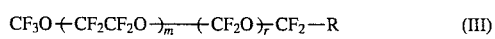

wherein R is 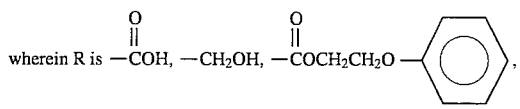

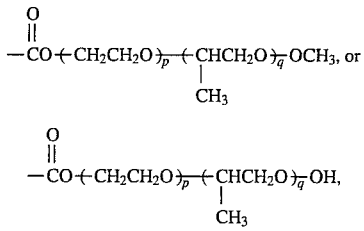

m is 1 to 50, n is 1 to 100, p is 0 to 100, q is 0 to 100 and r is 1 to 50.

5. The water-based mold release agent according to claim 4, wherein said phosphate ester (d) is a compound of formula (IV) or (V) below:

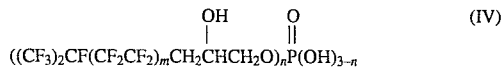

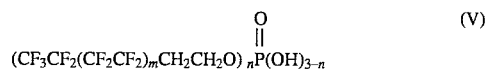

wherein m is 1 to 9 and n is 1, 2 or 3.

6. The water-based mold release agent according to claim 1, wherein said polyether (a) has a molecular weigh to 1,500 to 3,500.

7. The water-based mold release agent according to claim 1, wherein said phosphate ester (d) is a compound of formula (IV) or (V) below:

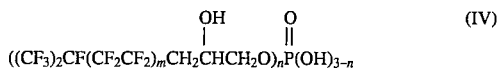 (IV)

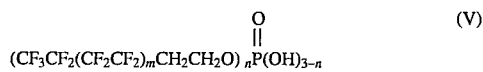 (V)

wherein m is 1 to 9 and n is 1, 2 or 3.

8. The water-based mold release agent according to claim 1, wherein said polyether (a) is present in an amount of 1 part by weight; said surfactant (b) is present in an amount of 0.02 to 0.8 parts by weight; and said phosphate ester (d) is present in an amount of 0.1 to 0.8 parts by weight.

9. The water-based mold release agent according to claim 8, wherein said polyether (a) is present in an amount of 1 part by weight; said surfactant (b) is present in an amount of 0.1 to 0.5 parts by weight; and said phosphate ester (d) is present in an amount of 0.2 to 0.3 parts by weight.

10. A method of using a water-based mold release agent, which comprises coating a mold with said mold release agent before introducing a synthetic resin or rubber in said mold, wherein said water-based mold release agent comprises: (a) a halogen-containing polyether having at least one functional group; (b) a surfactant; and (c) water.

11. A method of using a water-based mold release agent, which comprises coating a mold with said mold release agent before introducing a synthetic resin or rubber into said mold, wherein said water-based mold release agent comprises:
(a) a halogen-containing polyether having at least one functional group; (b) a surfactant; (c) water; and (d) a phosphate ester or salt thereof having a perfluoroalkyl group having 4 to 20 carbon atoms.

* * * * *